Nov. 14, 1961  ICHIRO MURATA  3,008,241
WELL SURVEYING INSTRUMENT
Filed Oct. 22, 1956  8 Sheets-Sheet 1

INVENTOR.
Ichiro Murata,
BY Pierce, Scheffler & Parker
his Attorneys

Nov. 14, 1961

ICHIRO MURATA 3,008,241

WELL SURVEYING INSTRUMENT

Filed Oct. 22, 1956

INVENTOR.

BY Ichiro Murata,
Pierce, Scheffler & Parker
his Attorneys

Nov. 14, 1961 ICHIRO MURATA 3,008,241
WELL SURVEYING INSTRUMENT
Filed Oct. 22, 1956 8 Sheets-Sheet 5

INVENTOR.
Ichiro Murata,
BY
Pierce, Scheffler & Parker
his Attorneys

Nov. 14, 1961 ICHIRO MURATA 3,008,241
WELL SURVEYING INSTRUMENT
Filed Oct. 22, 1956 8 Sheets-Sheet 6

INVENTOR.
Ichiro Murata,
BY Pierce, Scheffler & Parker
his Attorneys

INVENTOR.
Ichiro Murata,
BY
Pierce, Scheffler & Parker
his Attorneys

Nov. 14, 1961  ICHIRO MURATA  3,008,241
WELL SURVEYING INSTRUMENT
Filed Oct. 22, 1956  8 Sheets-Sheet 8

INVENTOR.
Ichiro Murata,
BY Pierce, Scheffler & Parker
his Attorneys

United States Patent Office 3,008,241
Patented Nov. 14, 1961

3,008,241
WELL SURVEYING INSTRUMENT
Ichiro Murata, 162-2 Higashita-machi, Suginami-ku, Tokyo, Japan
Filed Oct. 22, 1956, Ser. No. 617,522
2 Claims. (Cl. 33—205.5)

The present invention relates to an instrument for surveying the dip and orientation of a well and is an improvement over the device of my prior U.S. Patent No. 2,670,547.

In instruments for ascertaining the dip of a well, two types of indicating apparatus are generally used—instruments of the impression type having a scribing needle or the like which makes an imprint upon a chart, and instruments of the photographic type wherein a photographic representation of the position of cross hair means on a graph is represented. In these known devices, a pivotally-supported weight or pendulum means is utilized to provide a reference datum relative to gravity from which angles of inclination to the vertical or horizontal can be determined.

The precision of such known instruments depends on the magnification degree given by the distance between the supporting shaft of said weight and the tip of said element (which tip is the tip of the needle in the thrusting needle type or the cross hair line in the photographic type).

Increasing said distance increases the precision of the instrument. However, since said instrument must have its diameter so limited as to conform to the diameter of the well, said distance can not help being made comparatively small in order that a wide range of dips may be surveyed.

The main object of the present invention is to overcome such difficulty and to provide a well surveying instrument which has a high magnification degree.

According to the present invention a well surveying instrument is provided having an outer cylindrical casing, an inner cylindrical casing coaxially arranged within said outer casing, and fixed pivot means at each end of said inner casing on the longitudinal axis thereof for rotatably connecting said inner casing within said outer casing, said inner casing having an eccentrically displaced weighted portion adjacent one portion of the periphery thereof to cause said weighted portion to be lowermost when the axis of the casings is displaced from the vertical. A first weight member is pivotally secured within the inner casing about a pivot axis transverse to the longitudinal axis of said inner casing and transverse to the plane extending through the center of gravity of said inner casing weighted portion and the longitudinal axis of said inner casing. A scribing element is adjustably connected to said first weight member by angle adjusting means.

Said instrument is to be used after the relative position between said angle adjusting means has been effected. For example, in case the dip of the well is presumed to be around 30°, said adjustment should be made so that the center of indication of said element indicating the dip may indicate 30°.

In order to make it easy to understanding the instrument of the present invention, the present invention shall be explained in the following with reference to three embodiments thereof.

FIGS. 2 and 3 are cross-sectioned views showing the details of part A in FIG. 1.

FIG. 4 is a cross-sectioned view showing the details of part B in FIG. 1.

FIG. 5 is a cross-sectioned view showing the details of part C in FIG. 1.

FIG. 10 is a cross-sectioned view on line X—X in FIG. 5.

Figure 1:
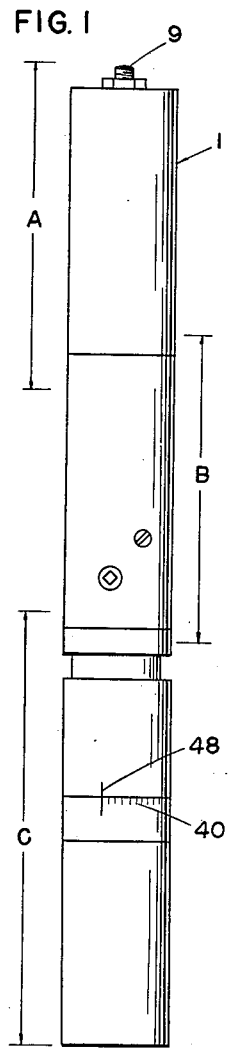
FIG. 1 is a general view of an embodiment of the present invention.
Figure 12:
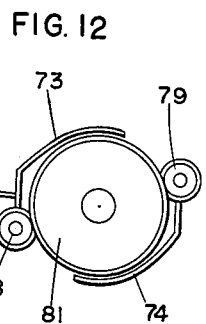
FIG. 12 is an illustrative view showing the mechanism embracing the skirt part of the magnet disc.

FIGS. 1–15 illustrate an embodiment of the present invention for surveying the dip together with the orientation. In these drawings, 1 is an outer casing. 2 is an inner casing which contains the trusting needle part and magnet disc part. Said inner casing 2 consists of an upper part 3, a middle part 4 and a lower part 5, said upper part 3 and middle part 4 being connected together by means of a screw thread 6 and said middle part 4 and lower part 5 being connected together by slidably fitting the lower end of the middle part 4 onto the upper end of the lower part 5.

7 and 8 are pivots provided above and below the inner casing 2, respectively, on the center line. 9 and 10 are pivot bearings to bear said pivots 7 and 8 respectively, and are provided on the axis of the outer casing 1. 11 is a weight member which causes unbalancing of the inner casing 2. 12 is an auxiliary thrusting needle which is so guided that the tip may move within the plane including the center of gravity of the weight and the axis of the inner casing 2. Spring 13 serves to bias the auxiliary thrusting needle 12 downwardly.

When the axis of the outer casing is inclined relative to the vertical direction, the weight 11 will pivot the inner casing 2 about its longitudinal axis to an equilibrium position with the weighted portion being lowermost. A plane passing through the center of gravity of weight member 11 and containing the longitudinal axis of the inner casing 2 will thus be vertical.

The main thrusting needle 14 is supported by weight member 15. Weight member 15 is pivotally supported by pivots 16, 17 fixedly mounted in inner casing 2 so that it may rotate around an axis intersecting at right angles with said plane including the center of gravity and the axis of the inner casing 2. Adjusting device 18 serves to alter the relative angular positions of the weight 15 and main thrusting needle 14.

The main thrusting needle 14 is disposed so that its axis may intersect at right angles with the axis of the pivots 16 and 17 and can be rotated by any desired angle around the axis of the pivots 16 and 17 by said adjusting device 18. To simplify the construction of the adjusting device 18, the worm 19 and the worm wheel 20 meshed therewith are both mounted upon weight 15 for rotation about their respective axes. As can be seen from FIGS. 2, 3 and 6, the axis of rotation of worm wheel 20 coincides with that established by the pivots 16, 17, and needle 14 passes through worm wheel 20 and is secured to the latter with the needle axis intersecting the axis of pivots 16, 17 at a right angle. Thus rotation of worm 19 results in rotation of worm wheel 20 which in turn effects a corresponding pivotal adjustment of the position of needle 20 relative to weight 15.

Graduation member 21 is secured to the weight 15 and indicator line 22 is attached to the head part 23 of the thrusting needle. The adjusting means 18 are set to position needle 14 at a given angle determined by a reading of indicator line 22 on graduation member 21, so that when the outer casing 1 is arranged at this given angle in the well hole, the tip of main thrusting needle 14 will be on the inner casing 2. Therefore, for example, when the indicator line 22 is set in the position of 30° on the graduation member 21, if the outer casing 1 is inclined by 30°, the main thrusting needle 14 will be stationary with its tip placed on the axis of the inner casing 2. In the case of the above example, if the inclination of the outer casing is made 30°+α°, the main thrusting needle 14 will stand still in a position inclined by α° to the axis of the inner casing.

Magnet disc 24 has a dip and orientation chart 25 attached thereto. Chart 25 has orientation and dip graduations thereon. Said chart paper will rise within the instrument as described later and will collide with the main thrusting needle 14 and the auxiliary thrusting needle 12 and thus be marked with dots or impressions whereby the dip and orientation of the well may be determined.

In the case where the indicator line 22 points to θ° on the graduation member 21, if a dot is marked in the center P of the chart paper by the main thrusting needle (FIG. 13), the well will dip by just θ°. When the indicator line 22 is set at θ° on the graduation 21 and the dip of the well is θ°+α°, a dot will be marked in a proper position Q showing α° on a concentric graduation 26 and the orientation of the well can be known by the direction PQ and the orientation graduation 27. The above mentioned line PQ can not be drawn in case point Q coincides with point P. Even if the point Q does not coincide with the point P, when the distance between points P and Q is short, said line can hardly be accurately drawn. The already described auxiliary thrusting needle is provided to correctly indicate the direction PQ. The dot by the auxiliary thrusting needle will be marked in a position well separated from the point P on the line PQ. It is because, in case only the dip of the outer casing 1 is varied with the orientation kept constant, the position of the dot of the main thrusting needle will move on the line PQ and the movement of the main thrusting needle 1 in this case will be made within the plane including the axis of the auxiliary thrusting needle 12. When the dot by the auxiliary thrusting needle 12 is caused to be marked on the orientation graduation 27 in fact, it is not necessary to draw the above mentioned line PQ.

Now, the mechanism for bringing the chart paper 25 into contact with the thrusting needle without disturbing the orientation shall be described. This mechanism includes:

(1) Means for keeping the magnet disc 24 free to rotate and horizontal, (2) A clamp device to clamp the magnet disc 24 within a plane intersecting at right angles with the axis of the inner casing 2 without disturbing the orientation, (3) A timing device to effect the above-mentioned clamping and (4) A clock device to operate the timing device and at the same time to push up the clamped magnet disc 24 by the timing device.

Figure 5:
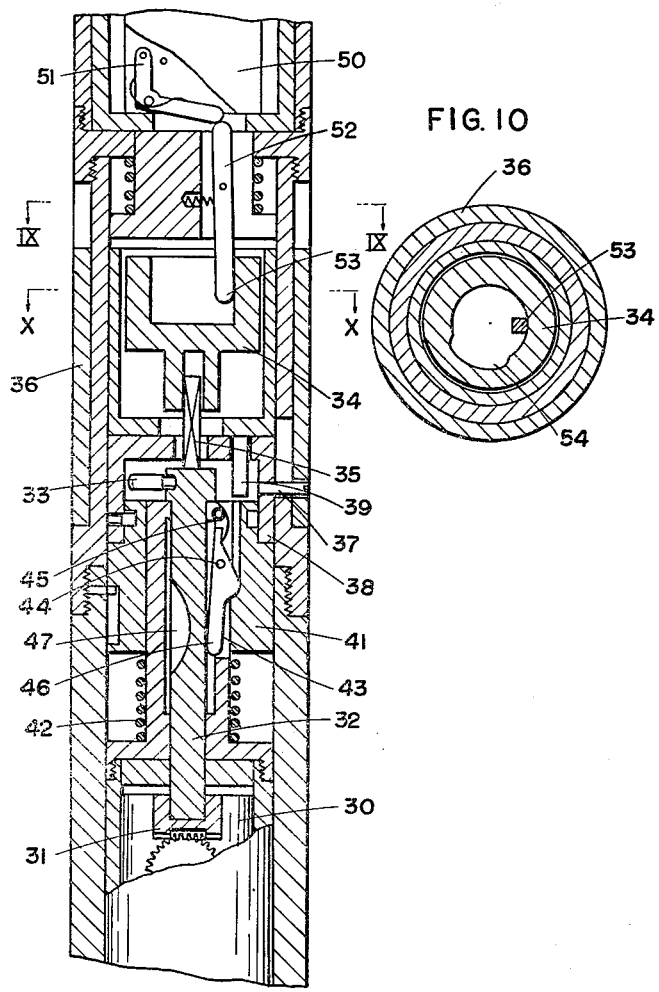
Figure 6:
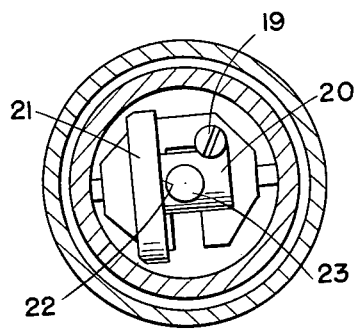
FIG. 6 is a cross-sectioned view on line VI—VI in FIG. 2.
Figure 7:
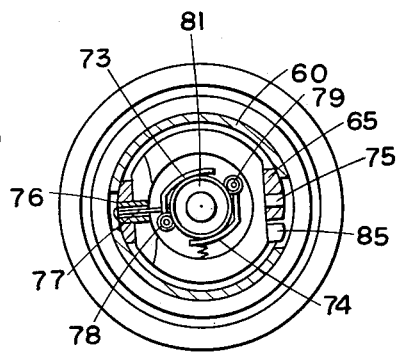
FIG. 7 is a cross-sectioned on line VII—VII in FIG. 4.
Figure 8:
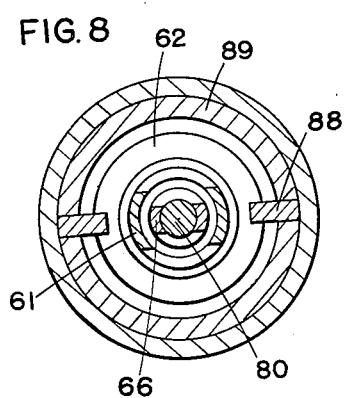
FIG. 8 is a cross-sectioned view on line VIII—VIII in FIG. 4.
Figure 9:
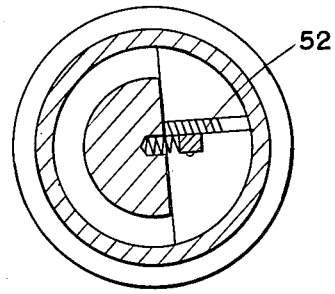
FIG. 9 is a cross-sectioned view on line IX—IX in FIG. 5.
Figure 11:
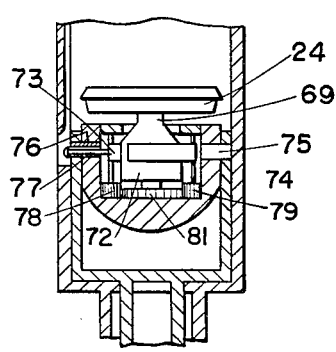
FIG. 11 is a cross-sectioned view showing the details of the magnet disc part.
Figure 13:
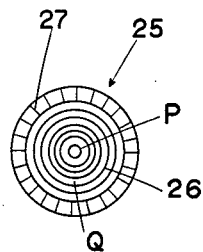
FIG. 13 is a plan view showing the chart paper.

In FIG. 5, 30 is a clock device. 31 is a crown gear. 32 is a member for winding up the spring of the clock device. 33 is a pin fixed to the member 32. 34 is a timing operating cylinder. 35 is a square pin to fit in the square hole of the operating cylinder 34 and is attached to the top of the member 32. 36 is a cylinder having secured thereto an inwardly projecting pin 37. Said pin 37 is fitted into the outside surface of the cylinder 38 and will rotate the cylinder 38 when the cylinder 36 is rotated. A pin 39 is secured in the cylinder 38 so that when cylinder 38 is rotated, pin 39 will rotate the pin 33 to wind up the spring of the clock device. The scale 40 shown in FIG. 1 indicates the setting of the clock device and is used to determine the time of operation of the clock device by taking the depth of the well into consideration. Axially movable member 41 is caused to be moved upwardly after a predetermined time set by the clock device. Spring 42 biases member 41 upwardly. Latch 43 prevents upward movement of the member 41 and is pivotally movable about pivot 44. Spring 45 applies a force in the direction to urge the tail end 46 of the latch 43 into engagement with the periphery of the member 32. 47 is a slot provided in the member 32 and will allow member 41 to rise by dropping the tail end 46 of the latch 43 into it at a predetermined time. The clock device can be set so that the axially movable member may rise after a predetermined time by first pushing down the cylinder 36 and then setting the indicator line 48 (see FIG. 1) in a desired position on the graduation 40.

The operation of the timing device is controlled by a latch 51. When latch 51 is in the latched position of FIG. 5, the self-timing device 50 is inoperable. However, upon rotation of timer operating cylinder 34 to a given position, the extremity 53 of member 52 will drop into slot 54 in the operating cylinder (see FIG. 10) to release latch 51. It should be mentioned that slot 54 is so positioned that latch 51 will be released before the release of latch 43. When latch 51 is released, timing device 50 will become operable to move operating bar 55 (FIG. 4) upwardly to correct the position of the magnet disk 24 (prior to the operation of the member 41) as described below.

Figure 4:
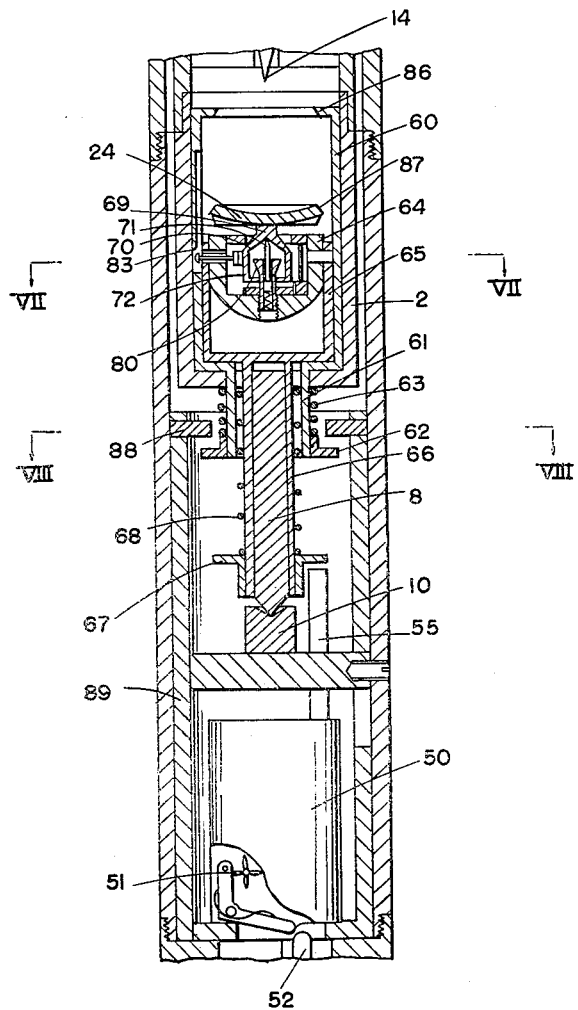

In FIG. 4, 60 is a cylinder contained so as to be free to slide in the lower part of the inner casing 2. 61 is a tubular extension extending axially from the lower end of the cylinder 60. 62 is a collar provided at the lower end of said extension. 63 is a spring interposed between said collar 62 and the bottom of the inner casing 2 so as to apply a downward force to the cylinder 60.

Another cylinder 65 rotatably supports the weight 64 and is slidably movable within cylinder 60. 66 is an extension of the cylinder 65 provided to enclose the pivot 8. 67 is a collar attached to the lower end of said extension. 68 is a spring interposed between said collar 67 and the bottom of the inner casing 2 so as to apply a downward force to the cylinder 65.

The magnet disc 24 has a hub 69 on its central under surface and is borne by a pivot bearing 70 provided in said hub 69 and a needle 71 attached to the weight 64 so as to be free to rotate. Said hub 69 has a skirt part 72. Said skirt part 72 will be embraced by embracing pieces 73 and 74 (see FIGS. 7, 11 and 12) when the cylinder 65 rises within the cylinder 60 accompanying the rise of the operating bar 55 of the timing device. The mechanism to operate these embracing pieces consists of an operating pin 77 passing through pin shaft 76 which with pin shaft 75 pivotally supports the weight 64, a pair of pinions 78 and 79 to which said embracing pieces 73 and 74, respectively, are attached, a large gear 81 attached concentrically to a piece 80 to attach the needle 71 to the weight 64 and in mesh with the pinions 78 and 79 and an inclined surface 83 (see FIG. 4) to push in the head part 82 of the operating pin 77 when the cylinder 65 rises.

The action of embracing the skirt part 72 by the embracing pieces 73 and 74 is performed in the early period of the rising stroke of the timing device operating bar 55.

The magnet disc 24 is pivoted so as to be within the plane normal to the axis of the inner casing without disturbing the orientation after the above mentioned embracing action is performed.

Figure 14:
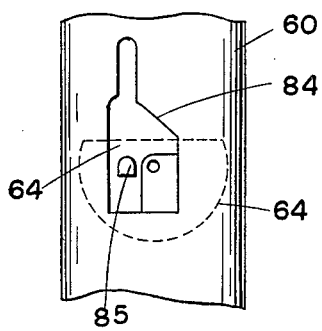
FIGS. 14 and 15 are partial views showing the mechanism of altering the dip of the magnet disc without disturbing the orientation.
Figure 15:
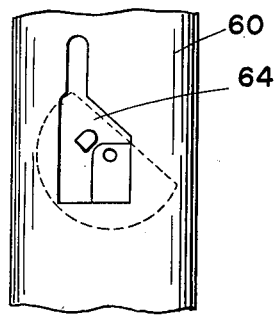

This dip correction of the magnet disc 24 is carried out by the cam surface 84 of the cylinder 60 and the projection 85 provided on the weight 64 shown in FIGS. 14 and 15.

In the rising stroke of the timing device operating bar 55, the magnet disc 24 will be first embraced by the embracing pieces 73 and 74, will then be raised, will take a position intersecting at right angles with the axis of the inner casing 2 and will come to a position to seat its conical surface 87 on a conical surface 86 provided at the top of the cylinder 60.

When the conical surface 87 is seated on the conical surface 86 (see FIG. 4) the collar 67 attached to the extension of the cylinder 65 will arrive at the collar 62 attached to the extension of the cylinder 60 and the subsequent rise of the timing device operating bar 55 will continue until the collar 62 of the cylinder 60 comes into contact with a limiting flange 88.

A short time after the timing device 50 acts as described above, the rise of the cylinder 89 (which supports the limiting flange 88) by the operation of the clock device will take place, the chart paper 25 (see FIG. 13) will be pushed against the tip of the thrusting pin and the dip and orientation will be recorded. The above mentioned operation of the clock device will be made by releasing the restraint of member 41 when the member 32 for winding the spring of the clock device has rotated and has come to a position which permits the tail end 46 of latch 43 to drop into slot 47.

Figure 16:
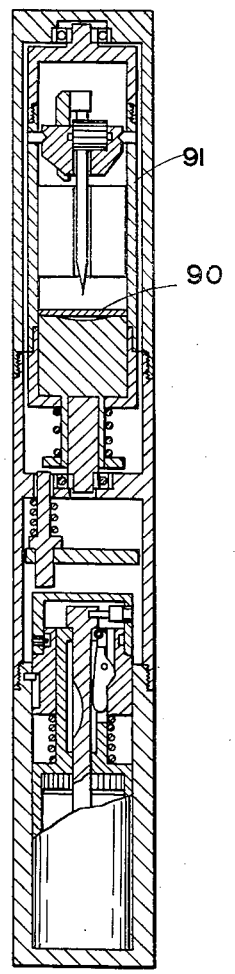
FIG. 16 is an axially sectioned view of another embodiment of the present invention.
Figure 17:
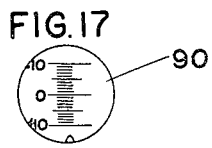
FIG. 17 is a plan view of the chart paper used in the instrument shown in FIG. 16.

The above described type of the instrument can determine the orientation as well as the dip of a well. However, in case only the dip is to be known, the type illustrated in FIGS. 16 and 17 may be used. This type has the same thrust pin part and clock device as of the above type but has no self-timer device. The chart paper 90 is fixed in a proper position crossing the inner casing 91. The graduation on the chart paper may be linear as illustrated in FIG. 17.

Figure 21:
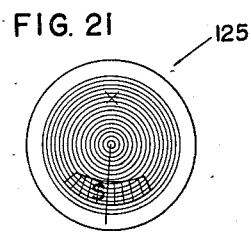
FIGS. 20 and 21 are views exemplifying the negative obtained by using said embodiment.
Figure 3:
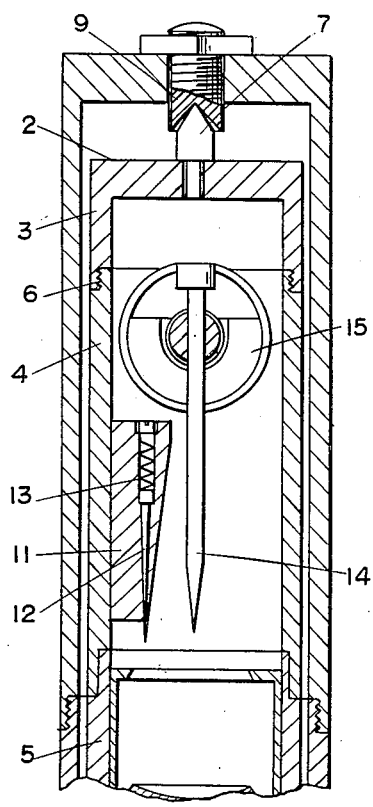
FIGS. 2 to 5 are detailed partial views thereof.
Figure 2:
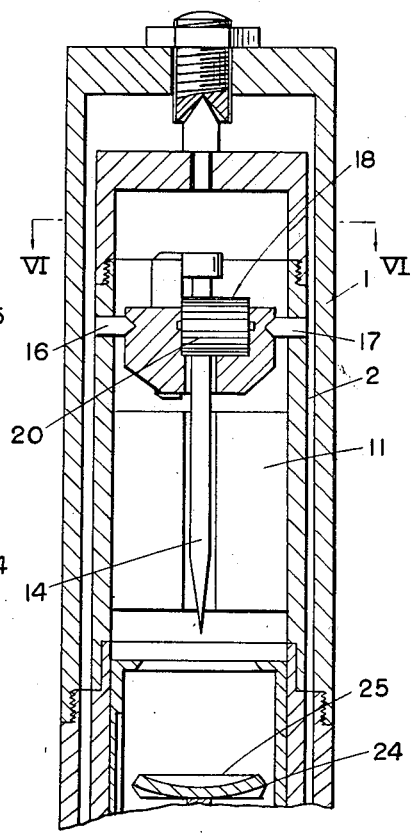
Figure 20:
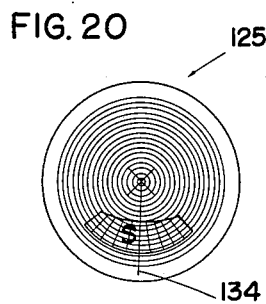
Figure 18:
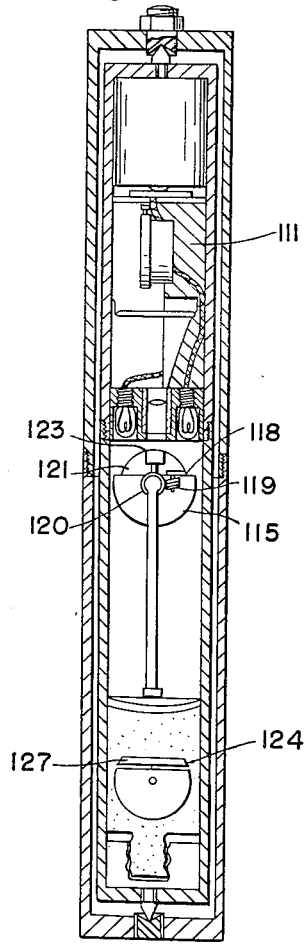
FIGS. 18 and 19 are axially sectioned views of still another embodiment of the present invention.
Figure 19:
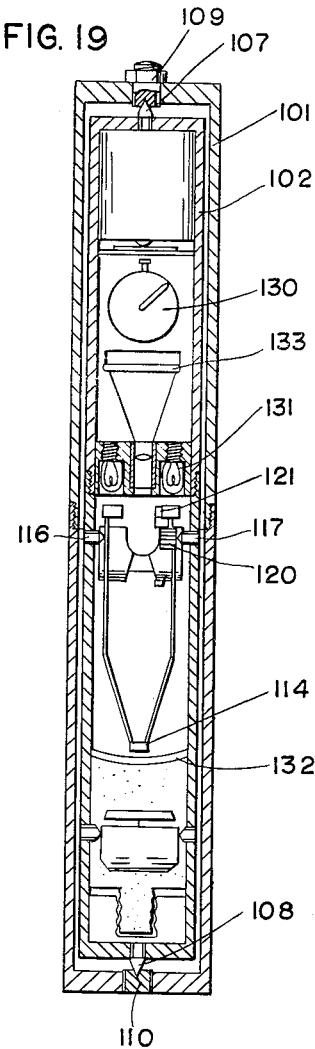

Shown in FIGS. 18 to 21 is an embodiment of the present invention of the photographing type. In this type, a member 114 having a cross is used for the member corresponding to the thrusting needle. The device supporting the member 114 and its adjusting device are the same as the already described type. Therefore, such reference numerals as 101 and 103 are to represent the respective corresponding parts which are represented by respective signs made by subtracing 100 from said reference numerals. Thus 101 is an outer casing; 102 is an inner casing. 107 and 108 are pivots. 109 and 110 are pivot bearings. 111 is an unbalanced weight provided in the inner casing. 114 is a member corresponding to the main thrusting needle. 115 is a weight attached to the member 114. 116 and 117 are pivots supporting the weight 115. 118 is an adjusting device interposed between the weight 115 and the member 114. 119 is a worm. 120 is a worm gear. 121 is a scale member showing the adjusted angles of the adjusting device. 123 is the head part (having an indicator line) of the member 114. 124 is a magnet disc. FIGS. 20 and 21 show representative negatives 125 obtained by photographing onto a film 133 and which correspond to the chart paper 25 of FIG. 2. 127 is an orientation graduation on the magnet disc. 130 is a clock device.

In this instrument, after a predetermined time determined by the clock device, the contact points will be closed, a light source 131 will be turned on and overlapping images of the cross of the member 114, a concentric graduation 132 (which has separately an orientation datum line 134) and the magnet disc 124 will be focused on a film 133 which is then developed to produce a negative, representative negatives being as shown in FIGS. 20 and 21. FIG. 20 shows a negative obtained in case the dip of the well is just $\alpha°$ when the adjusting device is adjusted to $\alpha°$. FIG. 21 shows the case wherein the dip of the well is $\alpha°+\beta°$ (when $\beta°\neq 0$).

What I claim is:

1. A well surveying instrument comprising an outer cylindrical casing, an inner cylindrical casing coaxially arranged within said outer casing, fixed pivot means at each end of said inner casing on the longitudinal axis thereof for rotatably connecting said inner casing within said outer casing, said inner casing having an eccentrically displaced weighted portion adjacent one portion of the periphery thereof to cause said weighted portion to be lowermost when the axis of the casings is displaced from the vertical, a first weight member pivotally secured within said inner casing about a pivot axis transverse to the longitudinal axis of said inner casing and transverse to the plane extending through the center of gravity of said weighted portion and the longitudinal axis of said inner casing, scribing means adjustably connected to said weight member, means for angularly adjusting the orientation of said scribing means with respect to said first weight member in a plane transverse to the pivot axis of said first weight member, a second weight member pivotally connected within said inner cylinder about a pivot axis transverse to the longitudinal axis of said inner cylinder, a magnet disc rotatably connected to said second weight member about an axis at right angles to the pivot axis of said second weight member and parallel to the longitudinal axis of said inner casing when said casing axis is vertical, said magnet disc being spaced from said scribing means, a record chart secured to said magnet disc adjacent said scribing means, means for progressively moving said magnet disc toward said scribing means, means responsive to the initial movement of said magnet disc toward said scribing means for locking said magnet disc against rotation relative to said second weight member, and means responsive to the subsequent movement of the magnet disc toward said scribing means for pivoting said second weight member to position the second chart in a plane transverse to the longitudinal axis of the inner casing as said magnet disc is moved toward said scribing needle and after said magnet disc has been locked against rotation by said locking means, whereby said record chart is brought into recording contact with said scribing means.

2. Apparatus as defined in claim 1 wherein said means for pivotally moving said second weight member comprises cam means.

References Cited in the file of this patent

UNITED STATES PATENTS

| 963,242 | Osterberg | July 5, 1910 |
|---|---|---|
| 1,442,000 | Reed | Jan. 9, 1923 |
| 1,868,833 | Hester | July 26, 1932 |
| 1,877,249 | McHugh et al. | Sept. 13, 1932 |
| 2,313,168 | Opocensky | Mar. 9, 1943 |
| 2,670,547 | Murata | Mar. 2, 1954 |
| 2,829,443 | Abs | Apr. 8, 1958 |

FOREIGN PATENTS

| 231,095 | Great Britain | Mar. 26, 1925 |